(12) United States Patent
Langdon

(10) Patent No.: US 7,301,610 B2
(45) Date of Patent: Nov. 27, 2007

(54) GAS VELOCITY SENSOR

(75) Inventor: Roger Martin Langdon, Chelmsford (GB)

(73) Assignee: Bae Systems plc, London (GB)

( * ) Notice: Subject to any disclaimer, the term of this patent is extended or adjusted under 35 U.S.C. 154(b) by 136 days.

(21) Appl. No.: 10/490,863

(22) PCT Filed: Feb. 24, 2004

(86) PCT No.: PCT/GB2004/000714

§ 371 (c)(1),
(2), (4) Date: Apr. 14, 2004

(87) PCT Pub. No.: WO2004/077067

PCT Pub. Date: Sep. 10, 2004

(65) Prior Publication Data

US 2004/0263826 A1 Dec. 30, 2004

(30) Foreign Application Priority Data

Feb. 26, 2003 (GB) .................................. 0304344.5

(51) Int. Cl.
*G01P 3/36* (2006.01)
(52) U.S. Cl. .................................................. 356/28.5
(58) Field of Classification Search ................. 356/28.5
See application file for complete search history.

(56) References Cited

U.S. PATENT DOCUMENTS

| 4,195,931 A * | 4/1980 | Hara ............................ 356/454 |
| 4,400,975 A * | 8/1983 | McGarr ..................... 73/204.22 |
| 4,818,101 A * | 4/1989 | Soreide et al. ............. 356/28.5 |
| 5,088,815 A | 2/1992 | Garnier et al. |
| 5,172,181 A | 12/1992 | Morbieu et al. |
| 5,317,376 A * | 5/1994 | Amzajerdian et al. ..... 356/28.5 |
| 5,394,243 A * | 2/1995 | de Mollerat du Jeu ..... 356/519 |
| 5,642,194 A | 6/1997 | Erskine |
| 5,701,009 A * | 12/1997 | Griffiths et al. .......... 250/356.1 |
| 6,040,899 A | 3/2000 | Breda |
| 6,313,908 B1 | 11/2001 | McGill et al. |

FOREIGN PATENT DOCUMENTS

| EP | 0 009 533 | 4/1980 |
| EP | 0 083 162 | 7/1983 |

OTHER PUBLICATIONS

H. Mocker et al, "Laser Doppler Optical Air-Data System: Feasibility Demonstration and Systems Specifications" *Applied Optics*, vol. 33, No. 27, Sep. 1994, pp. 6457-6471.

* cited by examiner

*Primary Examiner*—Thomas H. Tarcza
*Assistant Examiner*—Luke D. Ratcliffe
(74) *Attorney, Agent, or Firm*—Nixon & Vanderhye P.C.

(57) ABSTRACT

This invention relates to a gas velocity sensor such as an air velocity sensor for use on an aircraft such that the velocity of the aircraft can be determined. There is provided a gas velocity sensor comprising an electromagnetic radiation source operable to illuminate a gas; a photodetector operable to detect electromagnetic radiation scattered from the gas; an optical path linking the gas to the photodetector; an interferometer positioned on the optical path, the interferometer having an input for receiving electromagnetic radiation scattered by the gas and an output for producing an interference pattern when the interferometer is illuminated; and a spatial filter positioned on the optical path on the output side of the interferometer, the spatial filter having regions that are relatively transparent and relatively opaque that form a structure corresponding to an interference pattern produced by the interferometer.

36 Claims, 2 Drawing Sheets

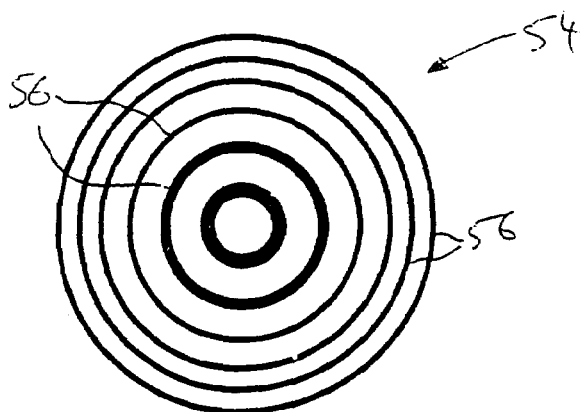
Figure 3
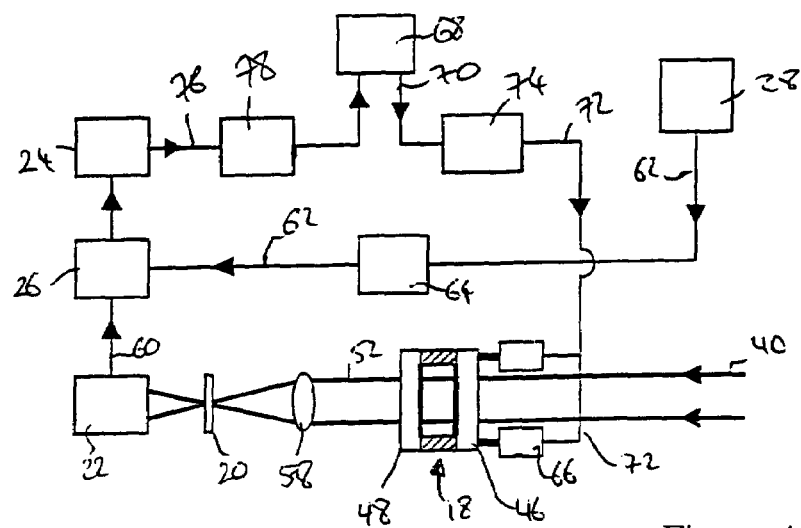
Figure 4
Figure 5

GAS VELOCITY SENSOR

This application is the U.S. national phase of international application PCT/GB2004/00714 filed in English on 24 Feb. 2004, which designated the U.S. PCT/GB2004/00714 claims priority to GB Application No. 0304344.5, filed 26 Feb. 2003. The entire contents of these applications are incorporated herein by reference.

This invention relates to a gas velocity sensor and to a method of determining a gas velocity. In particular, this invention relates to an air velocity sensor that is particularly suited to use on an aircraft such that the velocity of the aircraft can be determined.

Accurately measuring the velocity of an aircraft in flight is clearly an important issue and can be achieved in many different ways by mechanical, optical or electronic techniques.

One of the simplest and most commonly employed techniques is to use a Pitot tube. This is a small tube that projects from the front of an aircraft that measures the air pressure in the tube as the aircraft is in flight. The velocity of the aircraft relative to the air can be inferred from this air pressure using an approximate square-law relationship. This method has only limited accuracy and requires corrections to be applied for various effects such as humidity, temperature and flow disturbances that would otherwise lead to inaccurate velocity readings.

Electronic techniques employ global position sensors (GPS) to take readings over set time intervals such that the velocity can be found from the simple velocity-equals-distance-divided-by-time relationship. However, this technique suffers from the requirement for long integration times to obtain adequate accuracy and also the requirement for continuous availability of GPS signals from satellites. In addition, this technique provides a measure of the velocity in inertial space rather than the velocity relative to the air: the difference between these velocities can be critical, e.g. around the stall speed of an aircraft flying downstream.

The shortcomings of the above mechanical and electronic techniques has prompted an interest in optical methods for air velocity sensing.

An optical technique has been developed not for aircraft-based air velocity sensors, but for ground-based sensors used to measure the velocity of air currents in the atmosphere. Such sensors work on the principle that laser light scattered by the air molecules and other particles in the air (e.g. aerosols) will be subject to a Doppler shift of frequency if there is relative movement between the air velocity sensor and the air. Hence, a measure of the frequency shift of the scattered laser light gives a measure of the component of air velocity in the direction of propagation of the laser beam. In practice, a powerful laser beam is projected upwards and backscattered laser light is collected with a large aperture telescope and passed to a high-resolution frequency analyser such as a Fabry-Perot interferometer. The shift in frequency $\Delta f$ measured by the Fabry-Perot interferometer is related to the air velocity along the beam direction V by the equation:

$$\Delta f = \frac{2V}{\lambda} \quad \text{eq (1)}$$

where $\lambda$ is the wavelength of the laser light.

The intensity of backscattered light is strongly dependent on the wavelength of the light produced by the laser and on the nature of the scattering particles. At low altitudes, the concentration of aerosols is at its highest and so contributes heavily to the backscattered laser light. However, the concentration of aerosols varies by at least four orders of magnitude between sea level and 50,000 feet, the highest operating altitude for most aircraft. If an optical sensor of the type described above is to be adapted to operate on an aircraft, it must be able to operate at any altitude and under any weather conditions. Hence, the concentration of scattering particles must remain as constant as possible to maintain a reliable signal.

Against this background, and from a first aspect, the present invention resides in a gas velocity sensor comprising: an electromagnetic radiation source operable to illuminate a gas; a photodetector operable to detect electromagnetic radiation scattered from the gas; an optical path linking the gas to the photodetector; an interferometer positioned on the optical path, the interferometer having an input for receiving electromagnetic radiation scattered by the gas and an output for producing an interference pattern when the interferometer is illuminated; and a spatial filter positioned on the optical path on the output side of the interferometer, the spatial filter having regions that are relatively transparent and relatively opaque that form a structure corresponding to an interference pattern produced by the interferometer.

In this way the intensity of light incident on the photodetector may be monitored and the gas velocity estimated. This is because the interference pattern produced by the interferometer will be in varying degrees of registry with the pattern on the spatial filter and will therefore allow varying amounts of electromagnetic radiation to pass. The interference pattern varies as a function of the wavelength of the electromagnetic radiation incident on the interferometer and so is a measure of the Doppler frequency of the gas and hence the velocity of the gas relative to the gas velocity sensor.

Although it is preferred to use a Fabry-Perot interferometer, other interferometers may be employed. Essentially, any interferometer that produces an interference pattern that can be replicated on a spatial filter is appropriate.

Optionally, the spatial filter has a ring structure corresponding to the interference pattern produced by the interferometer when illuminated with electromagnetic radiation at substantially the wavelength of the electromagnetic radiation source. Thus, when the electromagnetic radiation is scattered from a moving gas, its wavelength may shift slightly about the wavelength of the electromagnetic radiation source and so is likely to be only partially diminished by mismatch between the interference pattern produced by the interferometer and the pattern on the spatial filter.

Optionally, a movable mirror is employed within a Fabry-Perot interferometer. As is well known, Fabry-Perot interferometers contain a pair of facing mirrors that bounce electromagnetic radiation off one another. Having at least one of the mirrors movable allows the separation between the mirrors to be varied: varying their separation alters the interference pattern they produce, i.e. the rings' radii increase or decrease. Conveniently, the Fabry-Perot interferometer may further comprise an electromechanical actuator operable to move the movable mirror, such as a piezoelectric device or the like.

Optionally, the electromagnetic radiation source is operable to produce ultra-violet light. This is advantageous when used in air velocity sensing because scattering is dominated by air molecules at ultra-violet wavelengths. This mitigates the effect of scattering from aerosols that cause a problem due to their varying concentration with altitude. Ultra-violet radiation is beneficial because scattering from air molecules is governed by the Rayleigh scattering process and the scattered light intensity is proportional to $\lambda^{-4}$, where $\lambda$ corresponds to the wavelength of the incident light Preferably, the light source is a laser with a neodymium:YLF laser being particularly preferred.

Optionally, the interferometer comprises a pair of mirrors and the laser comprises a laser cavity, the separation of the mirrors being set to equal to the time taken for light to travel the length of the laser cavity times the speed of light. This arrangement mitigates against the fact that most lasers produce signals at closely-spaced wavelength intervals that would otherwise produce bright regions in an interference pattern with a wide range of positions that effectively become superimposed to form an interference pattern that is smeared out with no net variation in intensity. By matching the mirror spacing to the effective length of the laser cavity (using the time taken for light to travel the real length times the speed of light compensates for differing refractive indices of components of the laser cavity), the bright regions produced by the interferometer coincide in the interference pattern to add constructively thereby reinforcing each other. Where the separation of the mirrors may be varied, the mean separation of the mirrors is matched to the effective length of the laser cavity. Preferably, the laser cavity comprises a crystal and a Q-switch bounded at one end by an input mirror and at the other end by an output mirror. It is advantageous for the input mirror to reflect at 1.064 μm and to transmit at 810 nm. Optionally, the output mirror is semi-reflective and wherein the gas velocity sensor further comprises a non-linear crystal and a filter arranged such that, in use, light output by the output mirror is incident firstly upon the non-linear crystal and then on the filter, wherein the filter transmits light substantially at the third harmonic and rejects light at other wavelengths.

Optionally, the gas velocity sensor further comprises a lens to collect light scattered by the gas. This allows light scattered to various angles to be collected and directed towards the interferometer, ensuring a greater intensity of light to pass through the gas velocity sensor. Preferably, the gas velocity electromagnetic radiation further comprises another lens for producing a substantially collimated beam and/or a narrow-band filter positioned on the optical path on the input side of the interferometer. The narrow-band filter is configured to allow electromagnetic radiation with a wavelength substantially coincident with that of the electromagnetic radiation source to pass whilst rejecting other wavelengths. This allows extraction of the relatively weak scattered electromagnetic radiation from the otherwise overwhelming background.

Preferably, the gas velocity sensor further comprises a lens for focussing electromagnetic radiation output by the interferometer to a focal plane coincident with the spatial filter. This brings the interference pattern produced by the interferometer into focus at the spatial filter and allows better matching of the pattern on the spatial filter to the interference pattern produced by the interferometer.

Optionally, the gas velocity sensor further comprises a voltmeter operable to measure a signal produced by the photodetector. Preferably, a gate is configured to receive a signal from the photodetector and send a signal to the voltmeter. This allows the electromagnetic radiation incident on the photodetector to be read in a selective manner. For example, a time delay may be used that corresponds to a certain time of flight from the electromagnetic radiation source to the photodetector. This is useful as the time of flight will correspond to sampling the gas at a set distance away from the gas velocity sensor. The gas velocity sensor may comprise a controller operable to open the gate, e.g. a pulse generator. In a preferred embodiment, the controller is operable to produce pulsed electromagnetic radiation output from the electromagnetic radiation source. This allows control of the timing interval between when a pulse of electromagnetic radiation is produced by the electromagnetic radiation source and when the photodetector is read. Optionally, the gas velocity sensor further comprises a time delay circuit configured to receive a signal from the controller and to pass a signal to the gate. This conveniently allows a desired time of flight to be set.

Optionally, the gas velocity sensor further comprises a computer, wherein the computer is operable to apply a voltage to the actuator and/or to receive a signal from the voltmeter.

Preferably, the gas velocity sensor is an air velocity sensor installed on an aircraft.

From a second aspect, the present invention resides in a method of determining gas velocity comprising the steps of: illuminating a gas with electromagnetic radiation; collecting electromagnetic radiation scattered by the gas such that at least some of the scattered electromagnetic radiation provides the input of an interferometer; passing at least some of the electromagnetic radiation output by the interferometer through a spatial filter, the spatial filter having regions that are relatively transparent and relatively opaque that form a structure corresponding to an interference pattern produced by the interferometer; and arranging a photodetector such that electromagnetic radiation output from the spatial filter is incident thereon.

Optionally, the method further comprises the step of illuminating the gas with ultra-violet light. Preferably, the method further comprises the step of passing electromagnetic radiation collected through a lens to produce a substantially collimated beam that is passed to the interferometer. In addition, the substantially collimated beam may optionally be passed through a narrow-band filter prior to passing the electromagnetic radiation to the interferometer.

Preferably, the method further comprises the step of passing the electromagnetic radiation output by the interferometer through a lens thereby focussing the electromagnetic radiation to a focal plane coincident with the position of the spatial filter.

Preferably, the interferometer has a pair of mirrors, at least one of which is movable, the method further comprising the step of moving the mirror so that the separation between the mirrors is varied and measuring the output of the photodetector at a plurality of mirror separations. Optionally, the step of adjusting the mirror separation is performed to obtain a maximum output from the photodetector. Alternatively, the step of adjusting the mirror separation is performed to scan the separation of the mirrors through a predetermined range. The method may optionally further comprise the steps of sending a voltage to an electromechanical actuator to effect movement of the mirror and recording the voltage produced by the photodetector as a function of the voltage applied to the actuator.

Optionally, the spatial filter has a structure corresponding to the interference pattern produced by the interferometer when illuminated with electromagnetic radiation at the wavelength of the electromagnetic radiation source.

The invention will now be described, by way of example only, by reference to the accompanying drawings in which:

FIG. 3 is an interference pattern produced by the Fabry-Perot interferometer of FIG. 2;

FIG. 4 shows schematically part of the air velocity sensor of FIG. 1 in greater detail; and FIG. 5 shows schematically the laser of FIG. 1 in greater detail.

Figure 1:
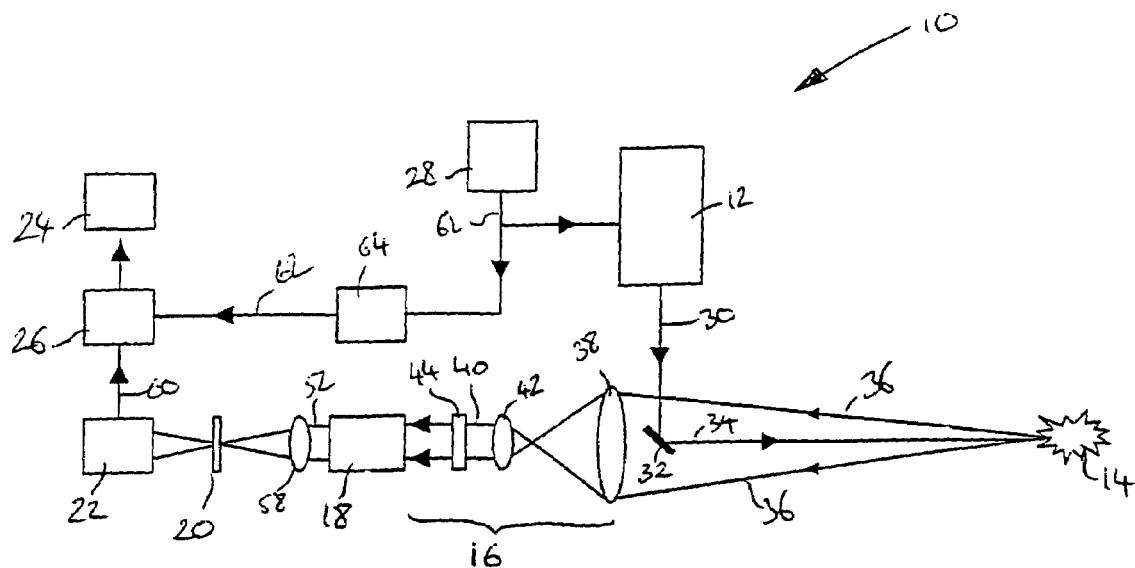
FIG. 1 shows schematically an air velocity sensor for use in an aircraft according to the present invention.

An aircraft-mounted air velocity sensor 10 is shown in FIG. 1. The air velocity sensor 10 comprises a laser 12 for illuminating an airstream 14, collecting optics 16 for collecting light backscattered from the airstream 14 and for transmitting light along an optical path that sees the light propagate through a Fabry-Perot interferometer 18, a spatial filter 20 and on to a photodetector 22. The output of the photodetector 22 is passed to a voltmeter 24 via a gate 26. The air velocity sensor 10 further comprises a pulse generator 28 operable to drive the laser 12 to produce pulses of light and also to drive the gate 26 of the voltmeter 24.

The laser 12 generates pulses of ultra-violet light in a narrow collimated beam 30 that is reflected by a small plane mirror 32 to form a reflected beam 34 that propagates into a flowing airstream 14 where it is scattered. The choice of an ultra-violet laser 12 means that the wavelength of the light 30, 34 is such that scattering is predominantly from air molecules rather than any aerosols in the airstream 14.

A proportion of the light backscattered 36 along the direction of the reflected beam is collected by the collecting optics 16 prior to transmission to the Fabry-Perot interferometer 18. The collecting optics 16 comprise a first lens 38 that collects the backscattered light 36 prior to the light being focused into an approximately collimated beam 40 by a second lens 42. The collimated beam 40 passes through a narrow-band filter 44 that transmits light at or close to the ultra-violet wavelength of the laser 12 but rejects all other wavelengths that arise from ambient light from the sky entering the first lens 38. This narrow-band filter 44 thus removes the dominant ambient light to leave the much weaker backscattered light 36 that subsequently propagates to the Fabry-Perot interferometer 18.

Figure 2:
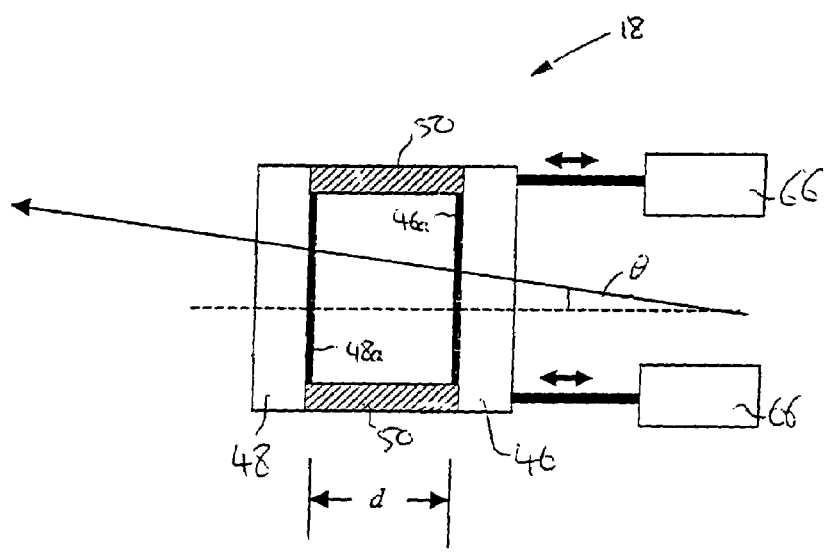
FIG. 2 shows schematically a Fabry-Perot interferometer for use in the air velocity sensor of FIG. 1.

The Fabry-Perot interferometer 18 is shown in more detail in FIG. 2. The filtered beam enters the Fabry-Perot interferometer 18 through a semi-reflective mirror 46. As is well known, the Fabry-Perot interferometer 18 comprises a second semi-reflective mirror 48: the semi-reflective mirrors 46, 48 are separated by spacers 50 such that mirror surfaces 46a, 48a are parallel to an accuracy much smaller than the wavelength of the ultra-violet laser light 30, 34 and are separated by a distance d. Two spacers 50 are shown in FIG. 2, but more may be used to improve the parallelism of the semi-reflective mirrors 46, 48.

A beam of light incident on the Fabry-Perot interferometer 18 reflects successively from the semi-reflective mirrors 46, 48 such that interference results. The interference pattern produced is seen in light emerging from the second semi-reflective mirror 48. The emergent light 52 varies in intensity by an amount related to the angle θ (measured with respect to the normal between the semi-reflective mirrors 46, 48, as shown in FIG. 2) and to its wavelength λ.

The transmitted light intensity t is given by $$t = \frac{t_0}{1 + F \sin^2\left(\frac{2\pi d}{\lambda}\cos\theta\right)} \text{ where} \qquad \text{eq (2)}$$

-continued $$F = \frac{4R}{(1-R)^2},$$

$t_0$ is the peak transmitted intensity and R is the reflectivity of the semi-reflective mirror surfaces 46, 48. If θ is small and the spacing d is made to be equal to ½Nλ₀ (where λ₀ is the nominal centre wavelength of a narrow range and N is any integer), the transmission t can be simplified to $$t = \frac{t_0}{1 + F \sin^2\left[\frac{2\pi d}{\lambda_0}\left(\frac{\theta^2}{2} - \frac{f}{f_0}\right)\right]} \qquad \text{eq (3)}$$

where f is a small deviation in the frequency of the laser away from the laser's nominal centre frequency $f_0$ and where $f_0 = c/\lambda_0$. The interference pattern 54 produced by the ultra-violet light of the laser 12 is shown in FIG. 3: this interference pattern 54 comprises a set of concentric rings 56 that can be seen in the light emerging from the Fabry-Perot interferometer 18 when it has been focused to the focal plane of a third lens 58.

A spatial filter 20 is placed at the focal plane of lens 58. The spatial filter 20 is an opaque surface containing concentric transparent apertures that correspond to the regions of bright light 56 in FIG. 3. Accordingly, the interference pattern 54 produced by the Fabry-Perot interferometer 18 when illuminated by the ultra-violet light from the laser 12 passes through the spatial filter 20 undiminished and is incident upon the photodetector 22.

The photodetector 22 produces a signal 60 that is proportional to the light intensity incident thereon. This photodetector signal 60 is read by the voltmeter 24 when allowed to pass through the gate 26. The gate 26 is activated by a 25 signal 62 passed by the pulse generator 28. The pulse generator 28 produces a regular sequence of pulses 62 that trigger the emission of ultra-violet light from the laser 12 and operate the gate 26 to the voltmeter 24 after a suitable time delay set by the fixed time delay circuit 64. In operation, pulses from the pulse generator 28 trigger output of pulsed light from the laser 12. Light backscattered 36 by the flowing airstream 14 enters the photodetector 22 after a delay corresponding to the time of flight through the path between the laser 12 and the photodetector 22. Thus, setting the time delay at 64 to a particular value enables the voltmeter 24 to measure light backscattered from a region in the flowing airstream 14 a predetermined distance away from the air velocity sensor 10.

Where the airstream 14 is not flowing, the backscattered light 36 will have the frequency $f_0$ of the laser 12. However, if the airstream 14 is flowing, the backscattered light 36 will be subject to a Doppler shift to a new frequency f slightly away from the laser frequency $f_0$. This results in the concentric rings 56 in the interference pattern 54 produced by the Fabry-Perot interferometer 18 shifting to slightly different radii, thereby creating a mismatch with the spatial filter 20. This mismatch produces a drop in the light intensity transmitted to the photodetector 22 and hence read by the voltmeter 24. The level of voltage drop is proportional to the shift in frequency which is in turn proportional to the velocity of the flowing airstream 14.

Accordingly, the above method and apparatus produces a measure of the velocity of a flowing airstream 14 in the direction of the reflected beam 34. However, a modification to this method and apparatus is preferred in order to give more accurate results.

Rather than using a Fabry-Perot interferometer 18 that has a fixed separation between the semi-reflective mirrors 46, 48, it is preferred to use a scanning Fabry-Perot interferometer 18. The separation of the semi-reflective mirrors 46, 48 is varied about a mean separation d by applying a uniform force to the periphery of one of the semi-reflective mirrors 46 via a number of electro-mechanical actuators 66 (e.g. piezoelectric devices). The spacers 50 have semi-elastic properties such that when force is applied to the semi-reflective mirror 46 by the actuators 66, the spacing d changes by a distance greater than half the wavelength of the light 30, 34 from the laser 12. Varying the spacing d causes the concentric rings 56 in the interference pattern 54 produced by the Fabry-Perot interferometer 18 to change in position, as can be inferred by inspection of equation (3).

By scanning the Fabry-Perot interferometer 18, interference patterns 54 can be produced with concentric rings 56 that scan across the spatial filter 20 such that at a particular value the concentric rings 56 of the interference pattern 54 will be in registry with the transparent rings 56 of the spatial filter 20 and a maximum voltage will be read by the voltmeter 24. By scanning the Fabry-Perot interferometer 18 across the frequency range corresponding to the range of expected Doppler frequencies, the change in the ring radius caused by the Doppler shift in frequency can be compensated by an equal and opposite shift due to the voltage applied to the actuators 66. Recording the voltage read by the voltmeter 24 as a function of the setting of the Fabry-Perot interferometer 18 gives a plot of the frequency of the backscattered light 36 against voltage. The peak of this curve defines the frequency shift due to the Doppler effect and hence defines the velocity of the airstream 14.

To achieve the above, the air velocity sensor 10 of FIG. 1 may be modified as shown in FIG. 4. Like parts are labelled with like reference numerals. A computer 68 produces a digital output 70 that is converted to an analogue voltage 72 by a digital-to-analogue converter 74. The analogue voltage 72 is applied to the actuators 66, thereby effecting scans of the Fabry-Perot interferometer 18. The voltage 76 produced by the voltmeter 24 is digitised by an analogue-to-digital converter 78 before being passed to the computer 68. The computer 68 records the measured voltage 76 against the voltage applied 72 to the actuators 66 in order to produce a plot of light intensity against Fabry-Perot interferometer 18 setting. The computer 68 then determines the frequency of the backscattered light 36 corresponding to the peak in the plot, taking into account the known characteristics of the Fabry-Perot interferometer 18 and other optical components of the air velocity sensor 10 (these can be found from calibration).

The air velocity sensor 10 described above works on the assumption that the laser 12 produces a stable output on a single optical mode of the laser cavity such that the laser frequency spectrum covers a narrow band corresponding approximately to the Fourier spectrum of the pulse shape. This is necessary so that the spectrum of frequencies detected corresponds largely to the spectrum of Doppler shifts caused by scattering from the airstream 14 (and modified by the characteristics of the Fabry-Perot interferometer 18) with only a small contribution from the spectrum of the laser 12.

Pulsed lasers that can operate in this way (i.e. with only a narrow range of frequencies) do so on the basis of seeded Q-switching. This arrangement uses a Q-switched solid state laser that normally operates on a number of axial modes of the laser cavity simultaneously. This leads to light produced simultaneously at a number of frequencies corresponding to the different axial modes. To reduce the frequencies down to a narrow range centred around one axial mode, a second laser is employed to operate continuously at a low power (typically only a few milliwatts) but only on a single mode of the laser, thereby producing an output laser beam having a very narrow frequency spectrum. Such devices employ frequency-selective optical elements in the laser cavity to ensure operation in one mode only, but this can only be achieved for low powers. To increase the power, the output from this continuously-operating laser is passed into the cavity of the Q-switched laser and is tuned to a frequency close to one of the axial modes of the Q-switched laser cavity. The output of the continuous laser is known as the seed power. When the Q-switch operates, the laser produces output pulses but only on the cavity mode matched in frequency to the seed laser. Accordingly, the output pulses have the desired narrow frequency spectrum.

Transferring such a seeded Q-switched laser to an aircraft is undesirable because of the weight, space and cost penalty of having two lasers and their associated optics. In addition, there is a problem in ensuring the two lasers remain coupled together in frequency due to the vibrations inherent in an aircraft in flight. Hence, a single-laser arrangement is preferable: this can be realised as follows.

FIG. 5 shows a diode-pumped neodymium:YLF laser 12'. This laser 12' is operated at the third harmonic of the 1.064 µm laser transition to produce ultra-violet light 30 with a wavelength of 355 nm. This produces a large amount of Rayleigh backscatter from air molecules at all operational altitudes.

As is illustrated in FIG. 5, the laser 12' comprises a neodymium:YLF crystal 80 with a high reflectivity coating 82 forming a mirror at one end. This coating 82 is optimised to reflect most strongly around 1.064 µm. A partially-reflective concave output mirror 84 is provided a short distance from the non-coated end of the crystal 80a, with an electro-optic Q-switch 86 interposed therebetween. The two mirrors 82, 84 are aligned to produce a laser cavity 88 on the axis of the crystal 80. It is convenient to make the overall length of the laser cavity 88 as short as possible so that the laser pulses are of a short duration (a few nanoseconds) with high peak power. The laser 12' is pumped by a continuous high power laser diode array 90 operating to produce light of a wavelength of approximately 810 nm that is focused by a lens system 92 into the crystal 80 through the end mirror 82. The end mirror 82 is designed to have a high transmission at 810 nm in addition to being optimised to reflect at 1.064 µm.

The Q-switch 86 is operated by a regular sequence of short electrical pulses supplied by a pulse generator 94 causing the laser 12' to generate pulses of light at approximately 1.064 µm. The pulses typically have a peak power of several kilowatts and a pulse repetition frequency of 10,000 to 50,000 pulses per second. The beam 96 that emerges from the partially-reflective mirror 84 is focused by a lens 98 into a non-linear crystal 100 that produces the second and third harmonics of the input wavelength. A filter 102 is used to select the third harmonic at 355 nm, whilst discarding the other wavelengths. Hence, a pulsed beam 104 with a mean power of about 100 mW is produced with a narrow frequency spectrum centred on a wavelength of 355 nm. The pulses 104 have a pulse repetition frequency to match that of the pulse generator 94, a pulse duration of a few nanoseconds and a peak power of about 1 kW. These pulses 104 are passed to the plane mirror to be reflected so as to illuminate the flowing airstream 14.

The pulsed beam 104 will contain a number of closely spaced laser frequencies separated by equal frequency intervals $f_1$ given by $$f_1 = \frac{1}{2t_1} \qquad \text{eq (4)}$$

where $t_1$ is the time taken for the light to travel between the mirrors 82, 84, taking into account the refractive indices of the crystal 80 and the Q-switch 86. Each of the frequencies will produce its own interference pattern 54 of concentric rings 56 and these will combine to form a pattern in the plane of the spatial filter 20 that has no regular ring pattern. Accordingly, there will be no frequency-dependent variation in light intensity incident on the photodetector 22 resulting from scanning of the Fabry-Perot interferometer 18.

This may be remedied by setting the mean separation of the semi-reflective mirrors d according to the following equation $$d = ct_1 \qquad \text{eq (5)}$$

In this case, all frequencies in the laser beam 104 produce ring patterns 56 in the plane of the spatial filter 20 that have near-identical radii, thereby producing the same variation in light intensity on the photodetector 22 as the Fabry-Perot interferometer 18 is scanned.

This returns us to the position as if a laser 12 emitting pulsed light at only one frequency was being used. The same performance with respect to accuracy of air velocity measurement may therefore be obtained by using a simple multimode Q-switched laser 12' rather than having to use the more complex arrangement of a seeded Q-switched laser.

It will be readily apparent to those skilled in the art that variations to the above described embodiment are possible without departing from the scope of the invention defined in the appended claims.

For example, it will be apparent that the present invention is not restricted to application in aircraft only, but can be employed in any situation where a determination of the velocity of a gas is required. For example, the ground-based sensor that measures air-velocities in the atmosphere described in the introduction could benefit from many features of the present invention. Of course, the present invention is not restricted to a measurement of air velocities but can be used to measure the velocity of any number of gases. Clearly, backscattering from the gas is required so the wavelength of the light used to illuminate the gas is best adjusted for optimal scattering strength. Where a gas does not scatter light strongly, particles may be introduced into the gas flow that do scatter light strongly.

The adjustable Fabry-Perot interferometer 18 embodiment described above merely scans the spacing d of the Fabry-Perot interferometer 18 to identify the Doppler shift of the backscattered light 36. However, an active feedback loop could be used such that the computer 68 controls the spacing d of the semi-reflective mirrors 46, 48 to ensure a peak light intensity is measured by the voltmeter 24. For example, the computer 68 may systematically increase or decrease the spacing d of the semi-reflective mirrors 46, 48 to maximise the voltage read by the voltmeter 24. The frequency of the backscattered light 36, and hence the velocity of the airstream 14, can then be inferred from the voltage set on the actuators 66 that produces the peak voltmeter reading. Alternatively, a feedback loop may be used such that the output of the voltmeter 24 is maintained at a constant level that is a fixed fraction of the peak value. Maintaining a voltage equal to one half of the peak voltage has been found to be advantageous because plotting a graph of the voltage produced by the voltmeter 24 against Doppler shift produces a curve with a maximum gradient around half the peak voltage. Operating in this region of high gradient means enhanced accuracy of measurement. This mode of operation may be implemented as follows.

Initially, the computer 68 produces a sequence of voltage step increments 72 for the actuators 66 thereby altering the spacing of the mirrors 46, 48 by stepped increments. The voltmeter's output 76 is measured by the computer 68 as a function of the drive voltage set on the actuators 66 to plot a curve of light intensity as a function of Doppler frequency. The computer 68 identifies the peak value of the curve and adjusts the mirror spacing d until the voltmeter signal 76 is equal to one half of the peak value. The computer 68 then continually adjusts the voltage 72 passed to the actuators to maintain the same value on the voltmeter signal 76. The voltage 72 is proportional to the Doppler shift in frequency and hence the air velocity, and hence the computer 68 can determine the air velocity. The computer 68 is programmed to resample the peak voltmeter signal 76 periodically. This is because the intensity of backscattered light 36 passing through the air velocity sensor 10 slowly changes due partly to changes in the output power of the laser 12 and partly due to changes in air density (e.g. because of a change in altitude).

The embodiment of FIG. 5 uses a second pulse generator 94 to operate the Q-switch 86. The other pulse generator 28 could of course be used to operate the Q-switch 86 through its signal 62 in addition to operating the gate 26, thereby removing the need for a second pulse generator. Moreover, the computer 68 could fulfil the role of the pulse generators 28, 94, i.e. the computer 68 could be used to generate the pulsed timing signal 62.

The invention claimed is:

1. A gas velocity sensor comprising:
   an electromagnetic radiation source operable to illuminate a gas whose velocity is to be measured;
   an interferometer, having an input for receiving electromagnetic radiation scattered by the gas and an output, for producing an interference pattern;
   a spatial filter on the output of the interferometer, the spatial filter having regions that are relatively transparent and relatively opaque that form a structure corresponding to an interference pattern produced by the interferometer; and
   a photodector for detecting electromagnetic radiation from said interferometer after passing through said spatial filter and providing an output indicative of gas velocity.

2. A gas velocity sensor according to claim 1, wherein the interferometer is a Fabry-Perot interferometer.

3. A gas velocity sensor according to claim 2, wherein the spatial filter has a ring structure corresponding to the interference pattern produced by the Fabry-Perot interferometer when illuminated with electromagnetic radiation at the wavelength of the electromagnetic radiation source.

4. A gas velocity sensor according to claim 2 or claim 3, wherein the Fabry-Perot interferometer has a movable mirror.

5. A gas velocity sensor according to claim 4, wherein the Fabry-Perot interferometer further comprises an electromechanical actuator operable to move the movable mirror.

6. A gas velocity sensor according to claim 5, wherein the actuator is a piezoelectric device.

7. A gas velocity sensor according to claim 1, wherein the electromagnetic radiation source is operable to produce ultra-violet radiation.

8. A gas velocity sensor according to claim 7, wherein the electromagnetic radiation source is a laser.

9. A gas velocity sensor according to claim 8, wherein the interferometer comprises a pair of mirrors and the laser comprises a laser cavity, the separation of the mirrors being set to be equal to the time taken for light to travel the length of the laser cavity times the speed of light.

10. A gas velocity sensor according to claim 8, wherein the electromagnetic radiation source is a neodymium:YLF laser.

11. A gas velocity sensor according to claim 10, wherein the laser cavity comprises a crystal and a Q-switch bounded at one end by an input mirror and at the other end by an output mirror.

12. A gas velocity sensor according to claim 11, wherein the input mirror is optimised to reflect at 1.064 μm and to transmit at 810 nm.

13. A gas velocity sensor according to claim 11, wherein the output mirror is semi-reflective and wherein the gas velocity sensor further comprises a non-linear crystal and a filter arranged such that, in use, light output by the output mirror is incident firstly upon the non-linear crystal and then on the filter, wherein the filter transmits light substantially at the third harmonic and rejects light at other wavelengths.

14. A gas velocity sensor according to claim 1, further comprising a lens to collect electromagnetic radiation scattered by the gas.

15. A gas velocity sensor according to claim 14, further comprising a further lens for producing a substantially collimated beam.

16. A gas velocity sensor according to claim 1, further including a narrow-band filter positioned on the input side of the interferometer.

17. A gas velocity sensor according to claim 1, further comprising a lens for focussing electromagnetic radiation output by the interferometer to a focal plane coincident with the spatial filter.

18. A gas velocity sensor according to claim 1, further comprising a voltmeter operable to measure a signal produced by the photodetector.

19. A gas velocity sensor according to claim 18, further comprising a gate configured to receive a signal from the photodetector and to send a signal to the voltmeter.

20. A gas velocity sensor according to claim 19, further comprising a controller operable to open the gate.

21. A gas velocity sensor according to claim 20, wherein the controller is operable to produce pulsed electromagnetic radiation output from the electromagnetic radiation source.

22. A gas velocity sensor according to claim 20, further comprising a time delay circuit configured to receive a signal from the controller and to pass a signal to the gate.

23. A gas velocity sensor according to claim 18, further comprising a computer, wherein the computer is operable to apply a voltage to the actuator and to receive a voltage signal from the voltmeter.

24. A gas velocity sensor according to claim 1, wherein the gas velocity sensor is an air velocity sensor installed on an aircraft.

25. A method of determining gas velocity comprising the steps of:
illuminating a gas with electromagnetic radiation;
collecting a portion of electromagnetic radiation scattered by the gas and providing some of said collected electromagnetic radiation to the input of an interferometer;
passing at least some of the electromagnetic radiation output by the interferometer through a spatial filter, where the spatial filter has regions that are relatively transparent and relatively opaque, said regions forming a structure corresponding to an interference pattern produced by the interferometer; and
arranging a photodetector such that electromagnetic radiation output from the spatial filter is incident thereon, said photodetector providing an output indicative of said gas velocity.

26. The method of claim 25, further comprising the step of illuminating the gas with ultra-violet light.

27. The method of claim 25, further comprising the step of passing electromagnetic radiation collected through a lens to produce a substantially collimated beam that is passed to the interferometer.

28. The method of claim 27, further comprising the step of passing the substantially collimated beam through a narrow-band filter prior to passing the electromagnetic radiation to the interferometer.

29. The method of claim 25, further comprising the step of passing the electromagnetic radiation output by the interferometer through a lens thereby focussing the electromagnetic radiation to a focal plane coincident with the position of the spatial filter.

30. The method of claim 25, wherein the interferometer has a pair of mirrors, at least one of which is movable, the method further comprising the step of moving the mirror so that the separation between the mirrors is varied and measuring the output of the photodetector at a plurality of mirror separations.

31. The method of claim 30, comprising the step of adjusting the mirror separation to obtain a maximum output from the photodetector.

32. The method of claim 30, further comprising the steps of sending a voltage to an electromechanical actuator to effect movement of the mirror and recording the voltage produced by the photodetector as a function of the voltage applied to the actuator.

33. The method of claim 25, wherein the spatial filter has a structure corresponding to the interference pattern produced by the interferometer when illuminated with electromagnetic radiation with a wavelength corresponding to that used to illuminate the gas.

34. A gas velocity sensor comprising:
an electromagnetic radiation source operable to illuminate a gas, wherein said source comprises a neodymium YLF laser producing ultra-violet radiation, wherein the laser includes a laser cavity comprising a crystal and a Q-switch bounded at one end by an input mirror and at the other end by a semi-reflective output mirror;
a non-linear crystal and a filter arranged such that light output by the output mirror is incident firstly upon the non-linear crystal and then on the filter, wherein the filter transmits light substantially at the third harmonic and rejects light at other wavelengths;
a photodetector operable to detect electromagnetic radiation scattered from the gas;
an optical path linking the gas to the photodetector;
an interferometer positioned on the optical path, the interferometer having an input for receiving electromagnetic radiation scattered by the gas and an output for producing an interference pattern when the interferometer is illuminated; and a spatial filter positioned on the optical path on the output side of the interferometer, the spatial filter having regions that are relatively transparent and relatively opaque that form a structure corresponding to an interference pattern produced by the interferometer.

35. A gas velocity sensor comprising:

an electromagnetic radiation source operable to illuminate a gas;

a photodetector operable to detect electromagnetic radiation scattered from the gas;

an optical path linking the gas to the photodetector;

a Fabry-Perot interferometer having a movable mirror controlled by an actuator and positioned on the optical path, the interferometer having an input for receiving electromagnetic radiation scattered by the gas and an output for producing an interference pattern when the interferometer is illuminated;

a spatial filter positioned on the optical path on the output side of the interferometer, the spatial filter having regions that are relatively transparent and relatively opaque that form a structure corresponding to an interference pattern produced by the interferometer;

a voltmeter operable to measure a signal produced by the photodetector and provide a voltage signal; and a computer, responsive to said voltage signal from said voltmeter, for applying a voltage to said actuator.

36. A method of determining gas velocity with a sensor comprising:

an electromagnetic radiation source operable to illuminate a gas;

a photodetector operable to detect electromagnetic radiation scattered from the gas;

an optical path linking the gas to the photodetector;

an interferometer positioned on the optical path, the interferometer having an input for receiving electromagnetic radiation scattered by the gas and an output for producing an interference pattern when the interferometer is illuminated, said interferometer having a pair of mirrors, at least one of which is movable; and a spatial filter positioned on the optical path on the output side of the interferometer, the spatial filter having regions that are relatively transparent and relatively opaque that form a structure corresponding to an interference pattern produced by the interferometer said method comprising the steps of:

moving the mirror so that the separation between the mirrors is varied and measuring the output of the photodetector at a plurality of mirror separations;

sending a voltage to an electromechanical actuator to effect movement of the mirror; and recording the voltage produced by the photodetector as a function of the voltage applied to the actuator.

* * * * *